United States Patent
Boddakayala et al.

(10) Patent No.: US 12,482,892 B2
(45) Date of Patent: Nov. 25, 2025

(54) THERMAL BARRIER FOR BUSBAR OF TRACTION BATTERY

(71) Applicant: Ford Global Technologies, LLC, Dearborn, MI (US)

(72) Inventors: Bhaskara Rao Boddakayala, Troy, MI (US); Joseph Ravenscroft, Dearborn, MI (US); James Lawrence Swoish, Northville, MI (US); Brian Utley, Canton, MI (US); Ravi Saripella, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 618 days.

(21) Appl. No.: 17/666,702

(22) Filed: Feb. 8, 2022

(65) Prior Publication Data

US 2023/0253663 A1 Aug. 10, 2023

(51) Int. Cl.
*H01M 50/298* (2021.01)
*H01M 10/613* (2014.01)
*H01M 10/625* (2014.01)
*H01M 10/653* (2014.01)
*H01M 50/50* (2021.01)
*H01M 50/503* (2021.01)
(Continued)

(52) U.S. Cl.
CPC ....... *H01M 50/298* (2021.01); *H01M 10/613* (2015.04); *H01M 10/625* (2015.04); *H01M 10/653* (2015.04); *H01M 50/50* (2021.01); *H01M 50/503* (2021.01); *H01M 50/505* (2021.01); *H01M 50/517* (2021.01); *H01M 50/521* (2021.01); *H01M 2220/20* (2013.01)

(58) Field of Classification Search
CPC ............ H01M 50/298; H01M 10/613; H01M 10/625; H01M 10/653; H01M 50/50; H01M 50/503; H01M 50/505; H01M 50/517; H01M 50/521; H01M 2220/20
See application file for complete search history.

(56) References Cited

U.S. PATENT DOCUMENTS 3,584,137 A * 6/1971 Weimer ................... H02G 5/06
174/117 FF
10,637,112 B2  4/2020 Shin et al.
(Continued)

FOREIGN PATENT DOCUMENTS

FR    3106239 A1 *  7/2021  ........ H01M 10/0422
JP    5699968 B2    2/2015
(Continued)

OTHER PUBLICATIONS

Machine translation of KR100671408B1 (Year: 2024).*
Machine translation of FR-3106239-A1 (Year: 2024).*

*Primary Examiner* — Milton I Cano
*Assistant Examiner* — Albert Michael Hilton
(74) *Attorney, Agent, or Firm* — David B. Kelley; Carlson, Gaskey & Olds, P.C.

(57) ABSTRACT

A busbar assembly includes a busbar core configured to electrically couple a first component to a second component. The busbar core has a first connection portion that directly connects the busbar core to the first component, a second connection portion that directly connects the busbar core to the second component. A thermal barrier system covers the busbar core including the first connection portion, the second connection portion, or both.

14 Claims, 5 Drawing Sheets

(51) Int. Cl.
*H01M 50/505* (2021.01)
*H01M 50/517* (2021.01)
*H01M 50/521* (2021.01)

(56) References Cited

U.S. PATENT DOCUMENTS

| | | | | |
|---|---|---|---|---|
| 2013/0143450 | A1* | 6/2013 | Casses | H01R 13/111 |
| | | | | 439/816 |
| 2016/0093864 | A1* | 3/2016 | Nakamura | H01M 50/524 |
| | | | | 429/121 |
| 2018/0294600 | A1* | 10/2018 | Loncar | H01R 13/5213 |
| 2018/0304835 | A1* | 10/2018 | Skalski | H02K 5/225 |
| 2018/0309281 | A1* | 10/2018 | Ichikawa | H01M 50/524 |
| 2020/0295336 | A1* | 9/2020 | Tallman | H01M 50/543 |
| 2020/0313141 | A1* | 10/2020 | Liu | H01R 25/14 |
| 2020/0403329 | A1* | 12/2020 | Durse | H01B 17/16 |
| 2022/0415537 | A1* | 12/2022 | Hwang | H01M 50/59 |
| 2023/0102692 | A1* | 3/2023 | Ahn | H01M 50/271 |
| | | | | 429/123 |

FOREIGN PATENT DOCUMENTS

| | | | |
|---|---|---|---|
| JP | 6018542 | B2 | 10/2016 |
| KR | 100671408 | B1 * | 1/2007 |
| KR | 20210141095 | * | 11/2021 |

* cited by examiner

THERMAL BARRIER FOR BUSBAR OF TRACTION BATTERY

TECHNICAL FIELD

This disclosure relates generally to a thermal barrier system and, more particularly, to a thermal barrier system of a busbar assembly within a traction battery.

BACKGROUND

A battery pack of an electrified vehicle can include groups of battery cells arranged in one or more battery arrays. Busbars can be used to distribute electrical power to and from the battery cells, and to and from the battery pack.

SUMMARY

In some aspects, the techniques described herein relate to a busbar assembly, including: a busbar core configured to electrically couple a first component to a second component, the busbar core having a first connection portion that directly connects the busbar core to the first component, and a second connection portion that directly connects the busbar core to the second a component; and a thermal barrier system that covers the busbar core including the first connection portion, the second connection portion, or both.

In some aspects, the techniques described herein relate to a busbar assembly, wherein the first component is a first battery array of a traction battery pack.

In some aspects, the techniques described herein relate to a busbar assembly, wherein the second component is a second battery array of the traction battery pack.

In some aspects, the techniques described herein relate to a busbar assembly, wherein the first connection portion directly contacts a terminal of the first battery array.

In some aspects, the techniques described herein relate to a busbar assembly, further including a mechanical fastener directly securing the first connection portion to the terminal.

In some aspects, the techniques described herein relate to a busbar assembly, further including an overmolded cap of the mechanical fastener.

In some aspects, the techniques described herein relate to a busbar assembly, further including a hinged lid of the thermal barrier system, the hinged lid configured to pivotably connect to another portion of the thermal barrier system such that the hinged lid is pivotable to a position covering the first connection portion and the mechanical fastener.

In some aspects, the techniques described herein relate to a busbar assembly, further including a snap-fit lid and a snap-fit base of the thermal barrier system, the snap-fit lid and snap-fit base configured to snap together to cover the first connection portion and the mechanical fastener.

In some aspects, the techniques described herein relate to a busbar assembly, wherein the thermal barrier system is a polymer or polymer-based material.

In some aspects, the techniques described herein relate to a busbar assembly, wherein the busbar core is a metal or metal alloy.

In some aspects, the techniques described herein relate to a busbar assembly, wherein the thermal barrier system is at least partially an overmolded thermal barrier system that is overmolded to a portion of the busbar core.

In some aspects, the techniques described herein relate to a busbar assembly, wherein the thermal barrier system is at least partially a snap-fit thermal barrier system that snap-fits about at least a portion of the busbar core.

In some aspects, the techniques described herein relate to a busbar assembly, wherein the thermal barrier system includes a tape that is adhesively secured to the busbar core.

In some aspects, the techniques described herein relate to a busbar assembly, wherein the thermal barrier system includes a coating that is adhesively secured to the busbar core.

In some aspects, the techniques described herein relate to a busbar assembly, wherein the thermal barrier system covers both the first connection portion and the second connection portion.

In some aspects, the techniques described herein relate to a method of reducing thermal energy transfer within a battery pack, including; connecting a connection portion of a busbar core directly to a first component; using the busbar core to electrically couple the first component to a second component; and covering areas of the busbar core with a thermal barrier system, the areas including the connection portion.

In some aspects, the techniques described herein relate to a method, wherein the thermal barrier system is overmolded to the busbar core.

In some aspects, the techniques described herein relate to a method, wherein the thermal barrier system is snap-fit to the busbar core.

In some aspects, the techniques described herein relate to a method, further including connecting the connection portion of the busbar core directly to the first component using a mechanical fastener.

In some aspects, the techniques described herein relate to a method, further including connecting the connection portion of the busbar core directly to a terminal of the first component.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

A typical traction battery pack includes an enclosure having an interior. Battery arrays and other components are held within the interior. Busbars can be used to electrically couple the battery arrays and other components. Busbars can be used to electrically couple the traction battery pack with components outside the interior.

This disclosure details a thermal barrier for a busbar. The busbar is associated with a battery array of the traction battery pack. The thermal barrier can be an electrically non-conductive protective layer. The thermal barrier can help to slow consumption of the busbar during a thermal event. This can reduce a likelihood of the thermal event extending to another battery array of the battery pack.

Figure 1:
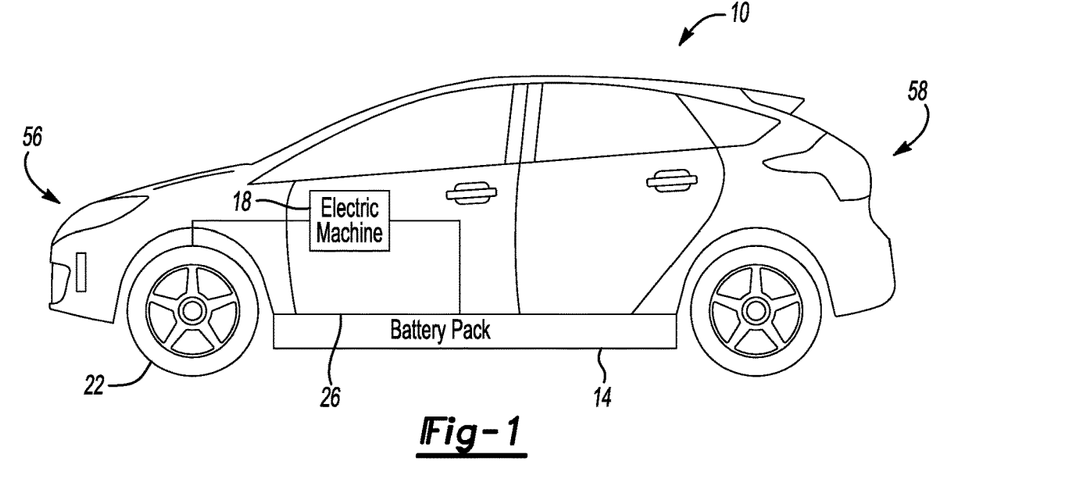
FIG. 1 illustrates a side view of an example electrified vehicle.

With reference to FIG. 1, an electrified vehicle 10 includes a traction battery pack 14 and an electric machine 18, and wheels 22. The traction battery pack 14 powers an electric machine 18, which converts electric power to torque to drive the wheels 22. The battery pack 14 can be a relatively high-voltage battery.

The battery pack 14 is, in the exemplary embodiment, secured to an underbody 26 of the electrified vehicle 10. The battery pack 14 could be located elsewhere on the electrified vehicle 10 in other examples. The battery pack 14 can be secured to the underbody 26 using straps and mechanical fasteners, for example.

The electrified vehicle 10 is an all-electric vehicle. In other examples, the electrified vehicle 10 is a hybrid electric vehicle, which selectively drives wheels using torque provided by an internal combustion engine instead, or in addition to, an electric machine. Generally, the electrified vehicle 10 could be any type of vehicle having a traction battery pack.

Figure 2:
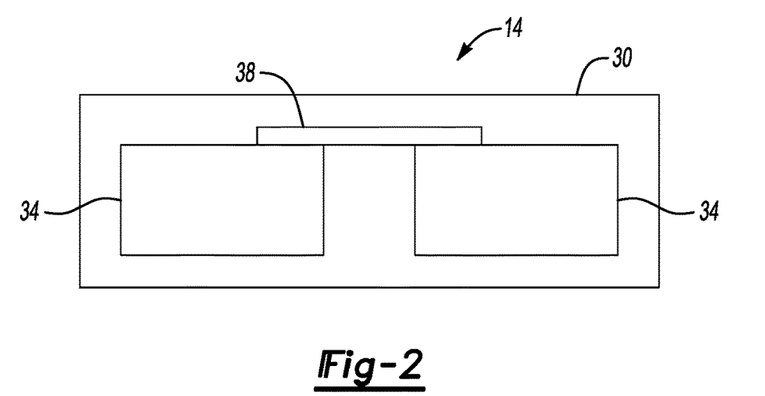
FIG. 2 schematically illustrates a busbar assembly connecting components of a traction battery pack from the vehicle of FIG. 1 according to an exemplary aspect of the present disclosure.
Figure 3:
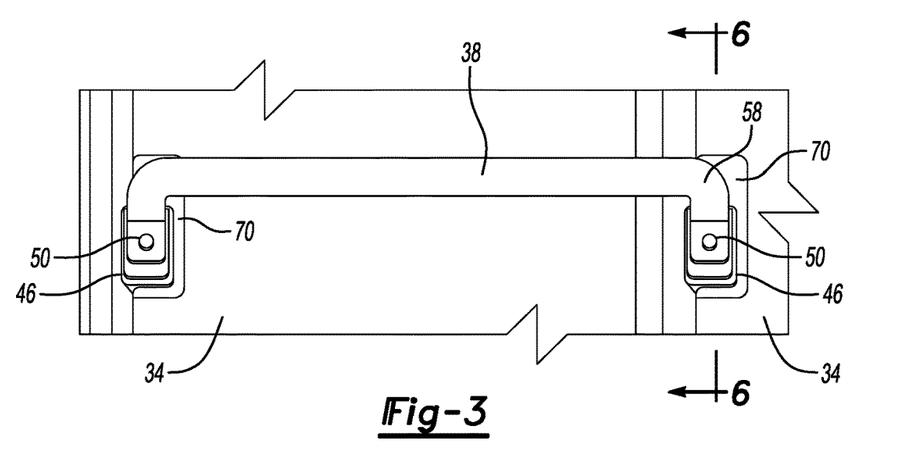
FIG. 3 illustrates a top view of the busbar assembly of FIG. 2 in an installed position within the traction battery pack.
Figure 4:
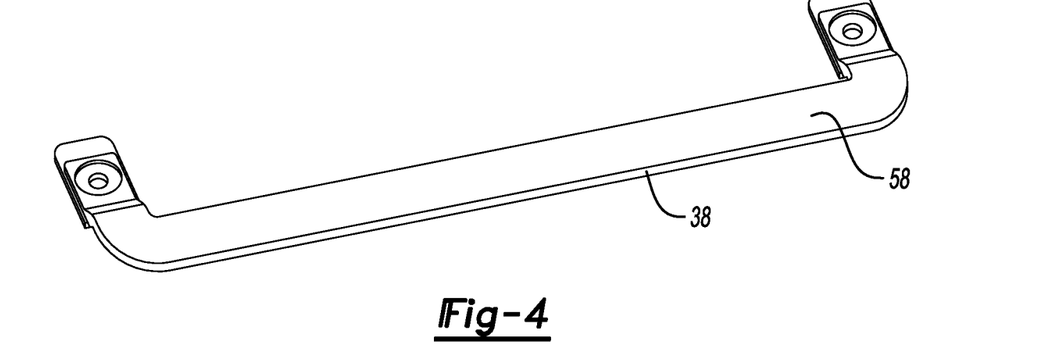
FIG. 4 illustrates a perspective top view of the busbar assembly of FIG. 3.
Figure 5:
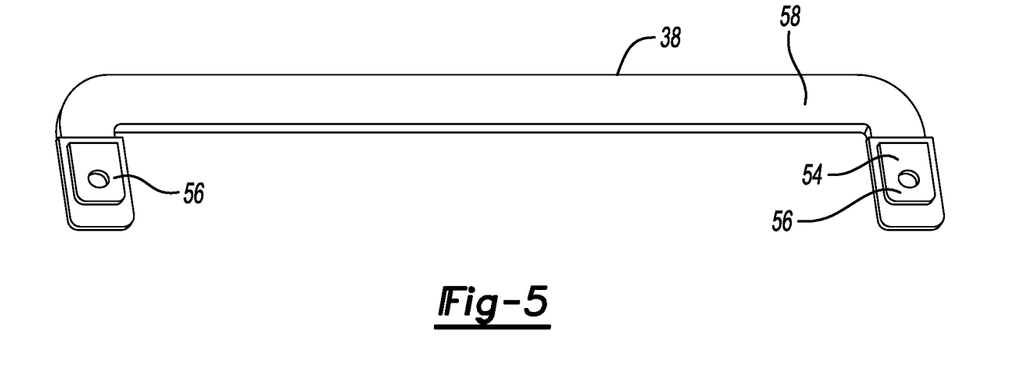
FIG. 5 illustrates a perspective bottom view of the busbar assembly of FIG. 3.

Referring now to FIG. 2 with continuing reference to FIG. 1, the battery pack 14 includes an enclosure 30 housing battery arrays 34 and busbars 38. The battery arrays 34 are electrically coupled to each other through the busbars 38. Other busbars could be used to electrically couple one or more of the battery arrays 34 to other components within the enclosure 30, or to components outside the enclosure 30.

With reference now to FIGS. 3-6, the busbar 38, in this example connects to terminals 46 of the battery arrays 34 In this example, a threaded fastener 50 is used to directly connect each end portion of the busbar 38 to one of the terminals 46.

The example busbar 38 is busbar assembly having a busbar core 54 that is substantially covered by a thermal barrier system 58. The busbar core 54 includes connection portions 56, which, in this example, are the portions of the busbar 38 that are directly connected to the terminals 46.

As known, a thermal event can be a rapid increase in temperature within a battery array. The thermal event can be due to overcharging, overdischarging, or short circuits, for example.

During a cell thermal propagation event, the thermal barrier system 58 can help to slow the rate at which thermal energy is transferred from the battery environment through the busbar 38 and the rate at which the busbar 38 is consumed. Retaining the non-conductive material can help to isolate electrical energy to a busbar connection point, such as the connection point of FIG. 6, rather than the electrical energy cascading to neighboring components. If, for example, one of the battery arrays 34 undergoes a thermal event, the movement of thermal energy can result in only a portion of the non-conductive material of the busbar 38 being consumed. An untended electrical connection to components of a neighboring battery array, such as a casing of the neighboring battery array, can be lessened due to the thermal barrier system 58. The chances for the neighboring battery array 34 experiencing a thermal event are thus reduced.

The busbar core 54, is a metal or metal alloy. In the exemplary embodiment, the busbar core 54 is copper. Electrical power is transferred through the busbar core 54 part of the busbar 38.

In the exemplary embodiment, the thermal barrier system 58 is a polymer-based material that is overmolded onto the busbar 38. The polymer-based material can be a material configured to withstand exposure to temperatures from 700 to 800 degrees Celsius continuously for five minutes. The material can additionally be configured to withstand a temperature of up to 1000 degrees Celsius for less than 40 seconds.

The material can be non-halogenated and can have a relatively high dielectric strength and a high Comparative Tracking Index of approximately 600 Volts or more.

In specific examples, the polymeric material of the thermal barrier system 58 consists of long/short glass fibers that provide an integrated inorganic additive. The additive can be an intumescent material that is included with the polymeric resin. In some examples, the high-temperature polymer materials can create a char layer when exposed to a temperature above 140 degrees Celsius, which can establish a thermal barrier and increase thermal resistance in order to help prevent an electrical short through the busbar 38 from one battery array 34 to another, and through other metals in the electrical path.

Referring to the thermal barrier as overmolded implicates structure. A person having skill in this art would be able to structurally distinguish a thermal barrier that is overmolded to a busbar core from a thermal barrier that is not overmolded to a busbar core.

Notably, the thermal barrier system 58 covers the connection portions 56 of the busbar 38, which can help to slow movement of thermal energy more than if these areas were left uncovered. Although both connection portions 56 are covered by the example thermal barrier system 58, other examples could cover only one of the connection portions 56.

Figure 6:
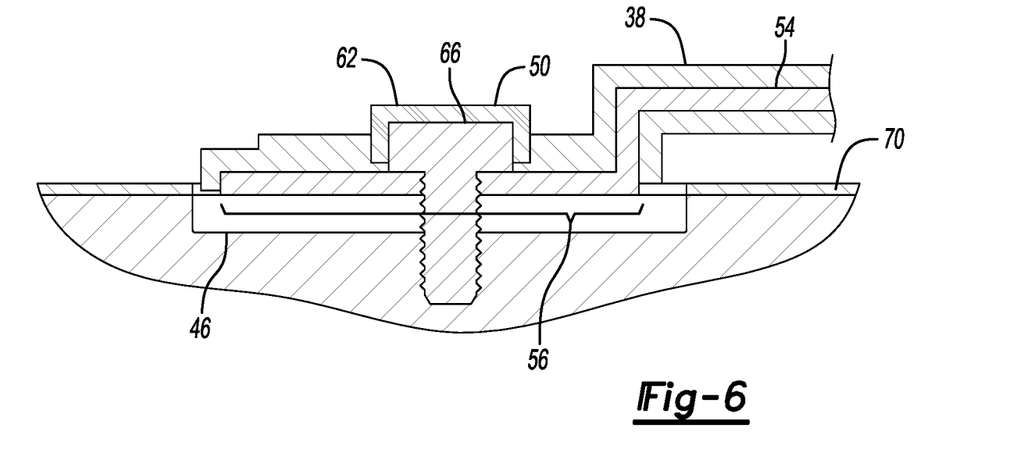
FIG. 6 illustrates a section view taken at line 6-6 in FIG. 5.

The fastener 50 can be a polymer material, or can, as shown in this example, have an overmolded cap 62 over a metal or metal alloy head 66 of the fastener 50. Making the fastener 50 polymer or to have an overmolded cap 62 can slow thermal energy transfer through the fastener.

Figure 7:
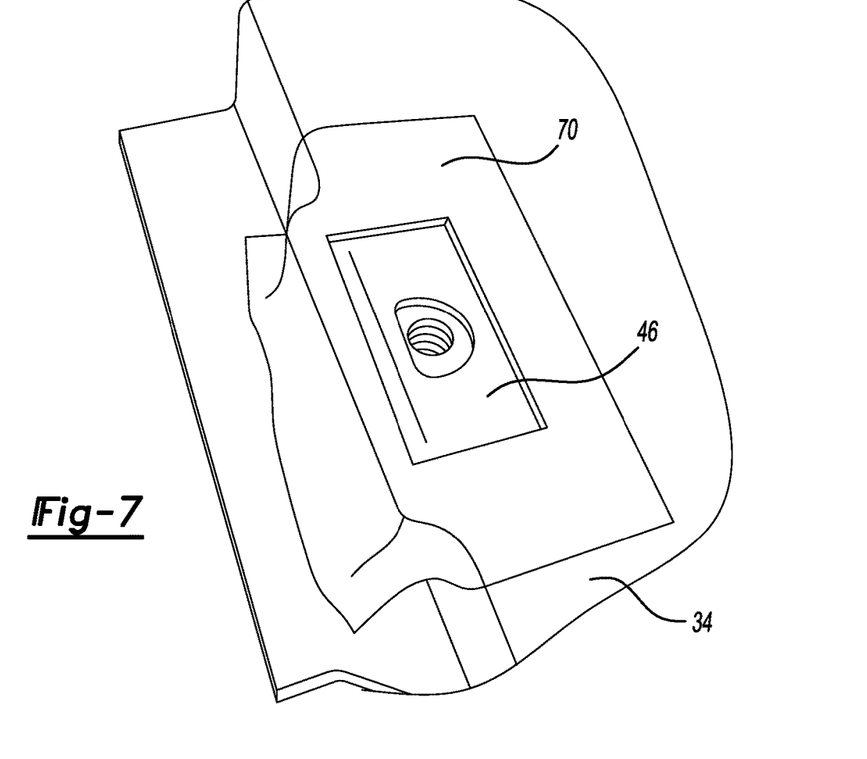
FIG. 7 illustrates a terminal of one of the components in FIG. 3.

As shown in FIG. 7, a tape 70 configured to withstand high temperatures can be placed about the terminals 46 to help further contain thermal energy. The tape 70 can help to fill any gaps between the thermal barrier system 58 of the busbar 38 and the battery array 34.

Figure 8:
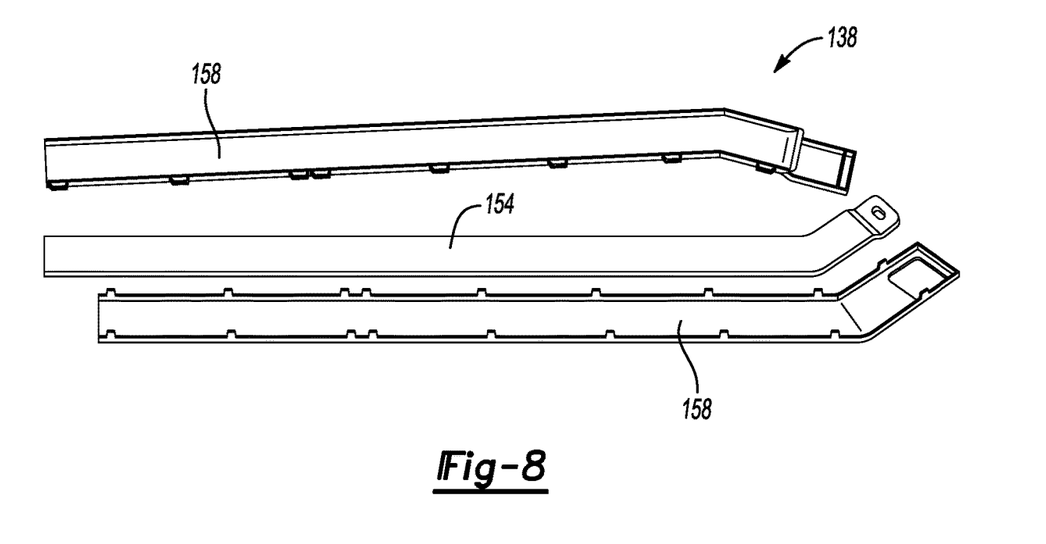
FIG. 8 illustrates a busbar assembly according to another exemplary aspect of the present disclosure prior to snap-fitting a thermal barrier system about the busbar core.

Referring now to FIG. 8, another example busbar assembly 138 includes a busbar core 154 and a multi-piece thermal barrier 158, which snap-fits to the busbar core 154. The multi-piece thermal barrier 158 can be molded separately from the busbar core 154, and then snap-fit over the busbar core 154 during assembly.

Figure 9:
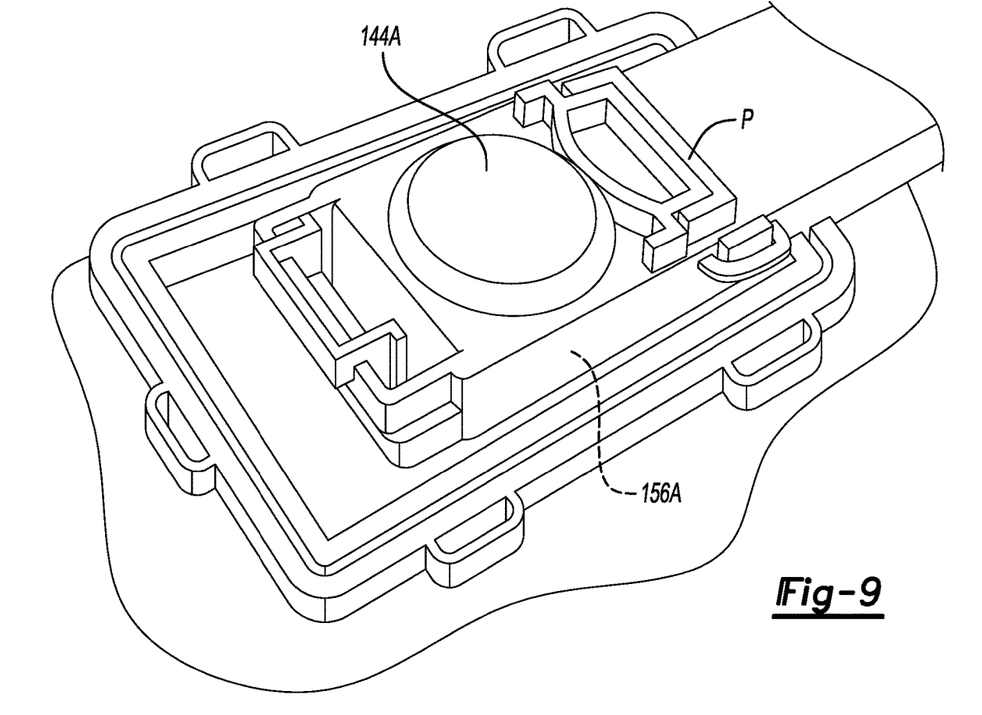
FIG. 9 illustrates a hinged cover type that can be used with the thermal barrier system of FIG. 8.

For exemplary purposes, two types of connection covers are used to cover the connection portions 156 of busbar core 154. The first cover type 156A is shown in FIG. 9. The first cover type 156A includes a hinged lid 144A that pivots about a pivot point P. Portions of the first cover type 156A are molded together with other pieces of the thermal barrier 158 shown in FIG. 8. The hinged lid 144A can be opened and closed as needed to access a fastener connecting the connection portion 156 to the battery array 34.

Figure 10:
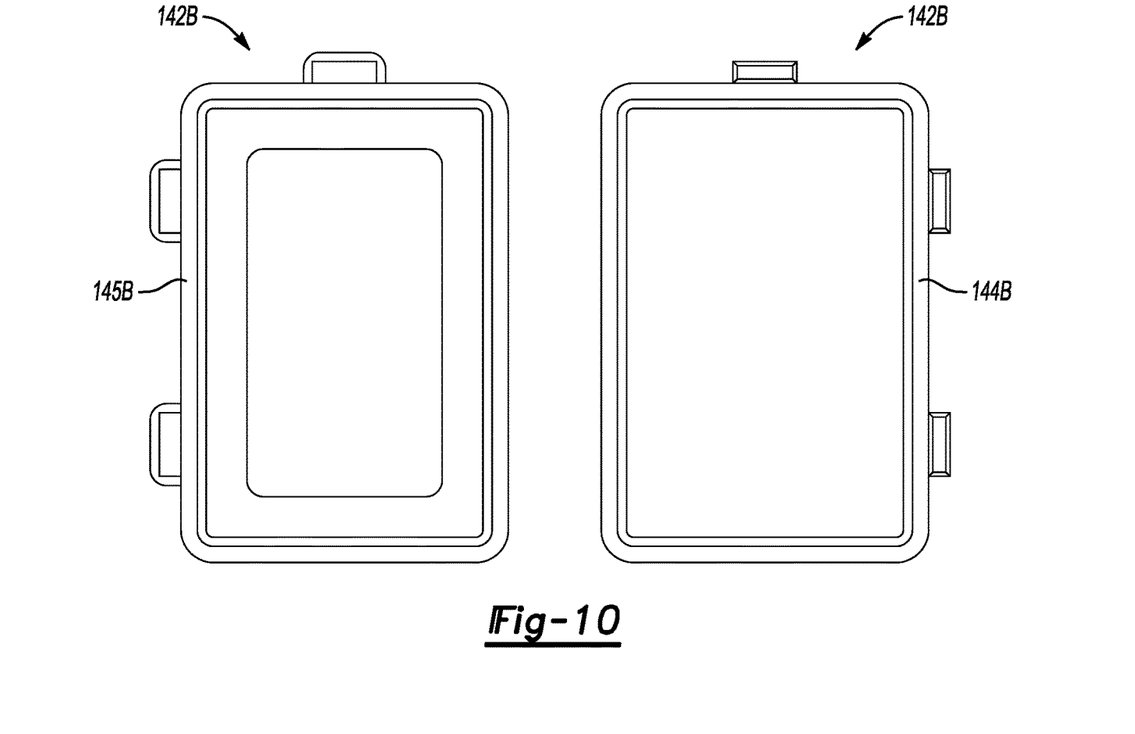
FIG. 10 illustrates a snap-fit cover type that can be used with the thermal barrier system of FIG. 8 prior to snap-fitting the snap-fit cover over a connection portion of the busbar core.
Figure 11:
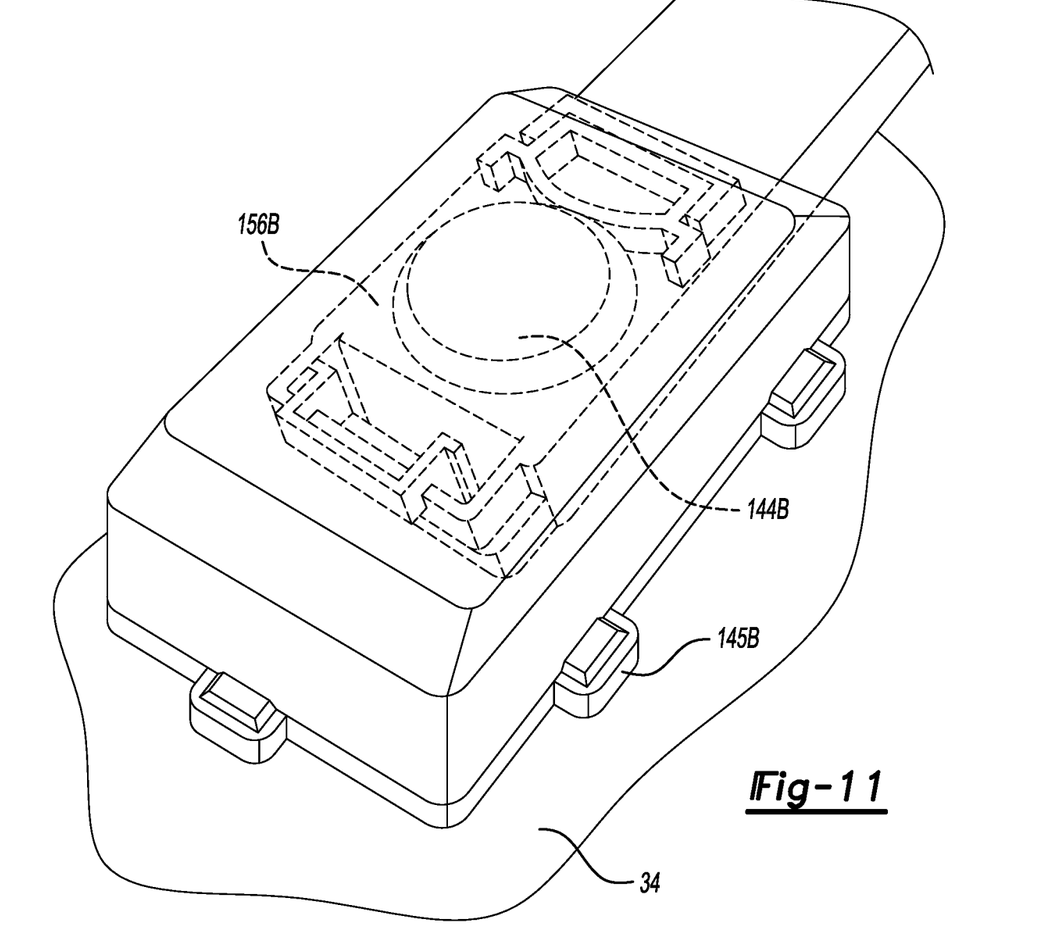
FIG. 11 illustrates the snap-fit cover type of FIG. 10 after snap-fitting the snap-fit cover over the connection portion of the busbar core.

The second cover type 156B is shown in FIGS. 10 and 11. The second cover type 156B includes a lid 144B that snap fits to a base 145B. The second cover type 156B is a snap-fit cover. The second cover type 156B is molded separately from the other pieces of the thermal barrier 158 shown in FIG. 8. The lid 144B can be removed as needed to access a fastener connecting the busbar assembly 138 to the battery array 34.

In an example, the second cover type 156B is a fiber-filled silicone material. The formulation can further include aerogel, glass bubble, and melamine. In an example, the formulation of high-temp silicone can be as follows in Table A.

TABLE A

| | Density (grams/milliliter) | % Weight Range |
|---|---|---|
| Silicone | 1.198264 | 80-94% |
| Milled Fibers | 1.37 | 1-3% |
| AeroGel | 0.08 | 0.5-3% |
| Glass Bubble | 0.22 | 0.2-2% |
| Mica Powder | 0.986 | 0.2-0.5% |

In other examples, the thermal barrier is not overmolded as shown in connection with the exemplary embodiment of FIGS. 3-6 or snap-fit as shown in connection with the exemplary embodiment of FIGS. 8-11. Instead, the thermal barrier shown in these embodiments can be a tape or coating. The tape could be, for example, a silica tape that is wound around the busbar core, or a coating that is adhesively secured to the busbar core. The tape or coating variations could extend to cover a terminal connection portion of the busbar core. Alternatively, the second cover type 156B of FIGS. 10 and 11 could be used to cover the terminal connection portion, and the tape or coating used to cover other areas of the busbar core.

Features of the disclosed examples, include using a thermal barrier on a busbar to mitigate thermal energy transfer between battery arrays and other components.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A busbar assembly, comprising:
a busbar core configured to electrically couple a first component to a second component, the busbar core having a first connection portion that directly connects the busbar core to the first component, and a second connection portion that directly connects the busbar core to the second component, the first connection portion configured to directly contact the first component; and
a thermal barrier system that covers the busbar core including the first connection portion where the first connection portion contacts the first component, the second connection portion, or both,
wherein the thermal barrier system is at least partially an overmolded thermal barrier system that is overmolded to a portion of the busbar core,
wherein the first component is a first battery array and the second component is a second battery array.

2. The busbar assembly of claim 1, wherein the first connection portion directly contacts a terminal of the first battery array.

3. The busbar assembly of claim 2, further comprising a mechanical fastener directly securing the first connection portion to the terminal.

4. The busbar assembly of claim 3, further comprising an overmolded cap of the mechanical fastener, the overmolded cap overmolded to the mechanical fastener.

5. A busbar assembly, comprising:
a busbar core configured to electrically couple a first battery array to a second battery array, the busbar core having a first connection portion that directly connects the busbar core to the first battery array, and a second connection portion that directly connects the busbar core to the second battery array, wherein the first connection portion directly contacts a terminal of the first battery array;
a thermal barrier system that covers the busbar core including the first connection portion, the second connection portion, or both;
a mechanical fastener directly securing the first connection portion to the terminal; and
a hinged lid of the thermal barrier system, the hinged lid configured to pivotably connect to another portion of the thermal barrier system such that the hinged lid is pivotable to a position covering the first connection portion and the mechanical fastener.

6. The busbar assembly of claim 1, wherein the thermal barrier system is a polymer or polymer-based material.

7. The busbar assembly of claim 6, wherein the busbar core is a metal or metal alloy.

8. A busbar assembly, comprising:
a busbar core configured to electrically couple a first battery array to a second battery array, the busbar core having a first connection portion that directly connects the busbar core to the first battery array, and a second connection portion that directly connects the busbar core to the second battery array; and
a thermal barrier system that covers the busbar core including the first connection portion, the second connection portion, or both,
wherein the thermal barrier system is at least partially a snap-fit thermal barrier system that snap-fits about at least a portion of the busbar core,
wherein the snap-fit thermal barrier system includes a snap-fit cover configured to cover a fastener that secures the first connection portion to the first battery array.

9. The busbar assembly of claim 1, wherein the thermal barrier system includes a tape that is adhesively secured to the busbar core.

10. The busbar assembly of claim 1, wherein the thermal barrier system includes a coating that is adhesively secured to the busbar core.

11. The busbar assembly of claim 1, wherein the thermal barrier system covers both the first connection portion and the second connection portion.

12. The busbar assembly of claim 1, further comprising the first component and the second component.

13. The busbar assembly of claim 5, wherein the hinged lid in the position covers the mechanical fastener and a portion of the first connection portion that is in direct contact with the terminal.

14. The busbar assembly of claim 8, further comprising the fastener extending through an aperture in the first connection portion, the snap-fit cover covering the fastener and the aperture.

\* \* \* \* \*